C. M. TESSIÉ du MOTAY.
Process and Apparatus for Manufacturing Hydrogen Gas.

No. 229,339. Patented June 29, 1880.

Witnesses:
Geo. W. Miatt
Anthony Gref Jr

Inventor:
C. M. Tessié du Motay
By his Attorney,
E. N. Dickerson Jr

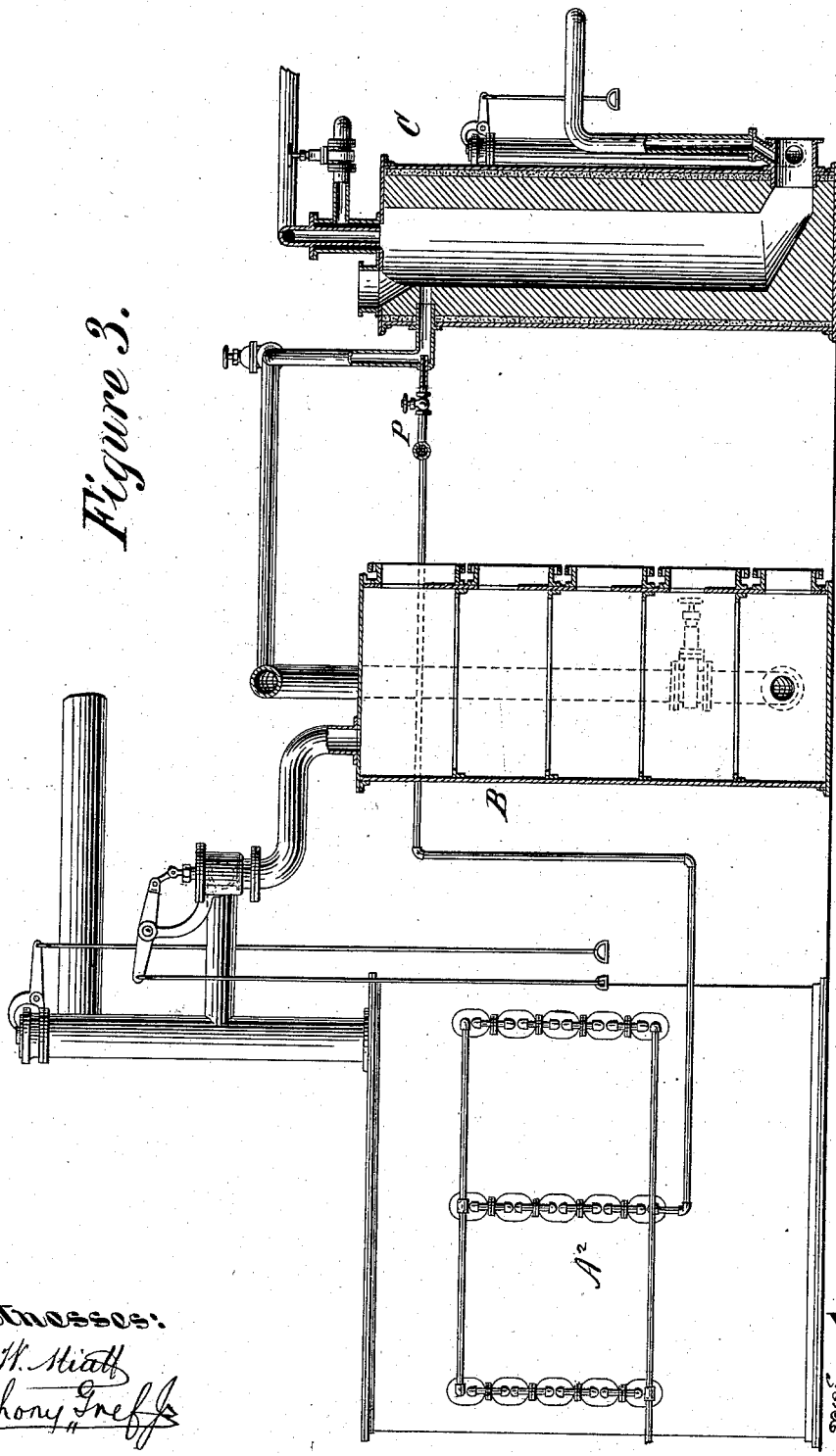

C. M. TESSIÉ du MOTAY.
Process and Apparatus for Manufacturing Hydrogen Gas.
No. 229,339. Patented June 29, 1880.
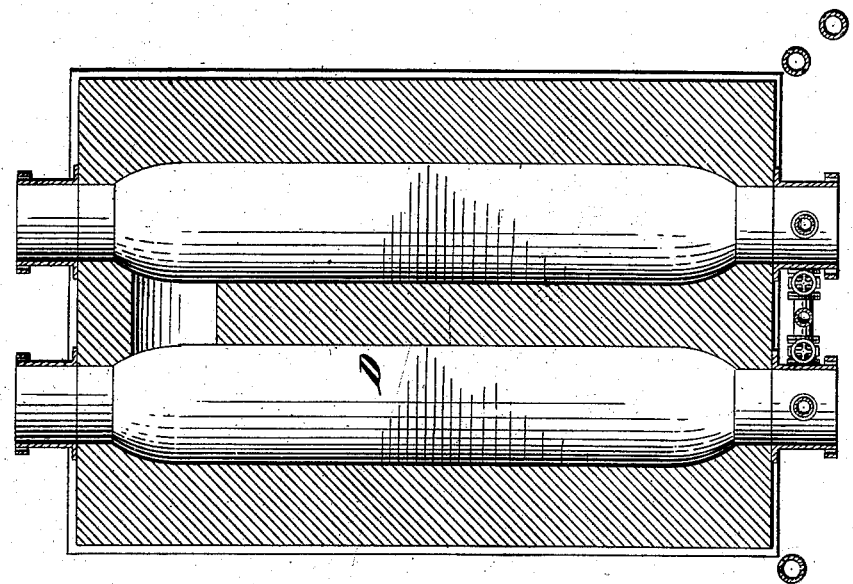
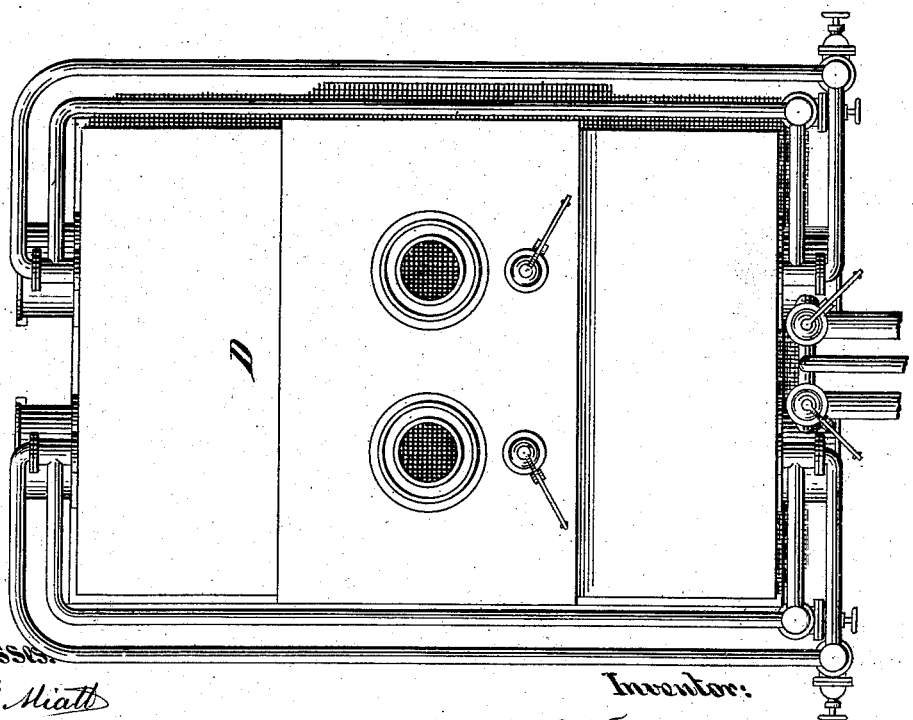

C. M. TESSIÉ du MOTAY.
Process and Apparatus for Manufacturing Hydrogen Gas.
No. 229,339. Patented June 29, 1880.
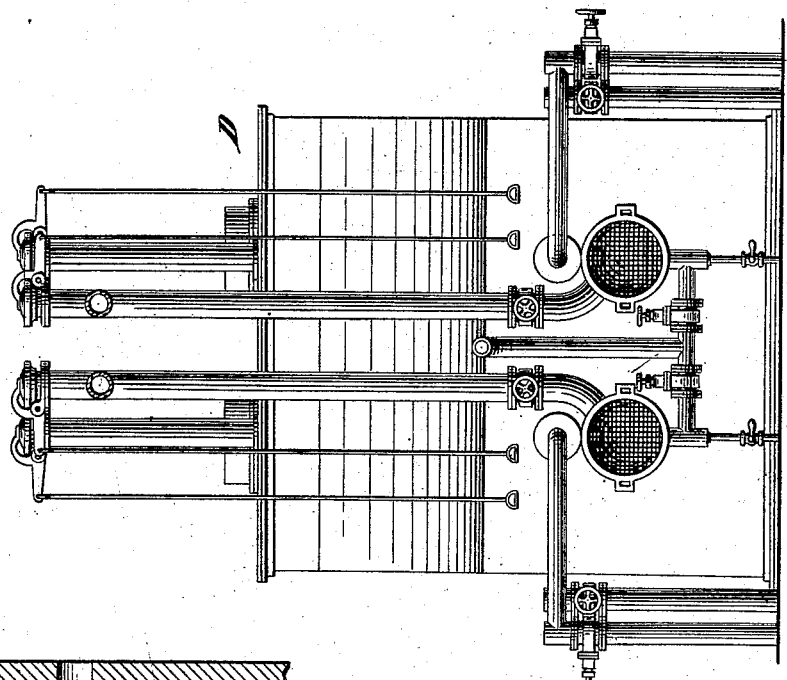
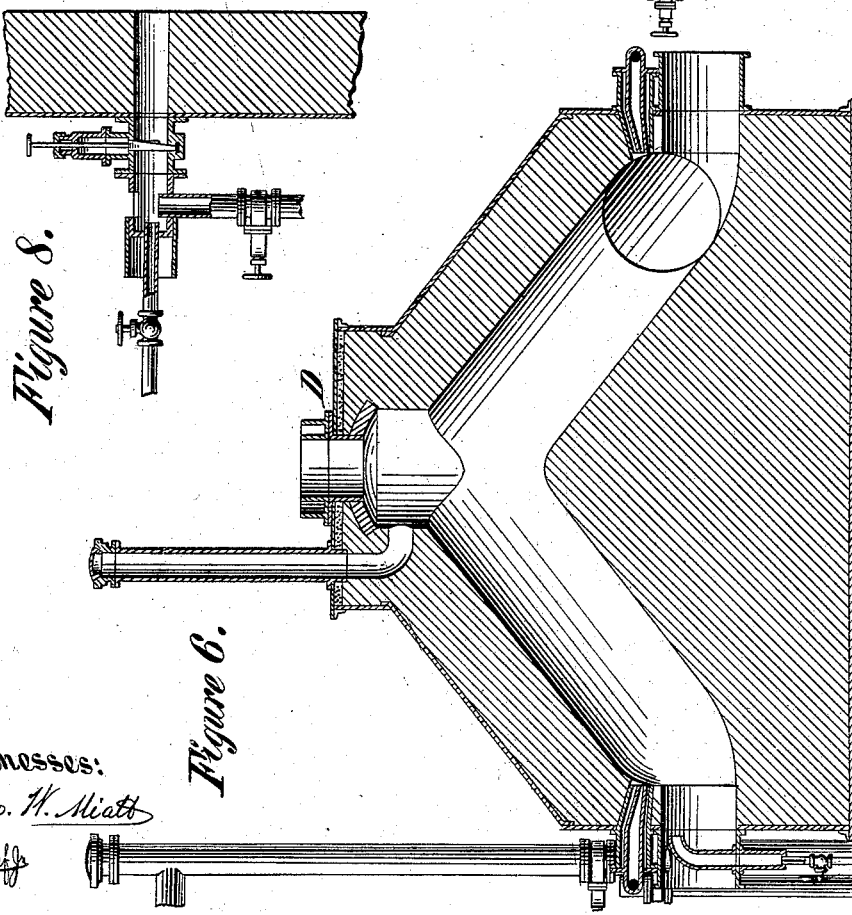

UNITED STATES PATENT OFFICE.

CYPRIEN MARIE TESSIÉ DU MOTAY, OF PARIS, FRANCE.

PROCESS AND APPARATUS FOR MANUFACTURING HYDROGEN GAS.

SPECIFICATION forming part of Letters Patent No. 229,339, dated June 29, 1880.

Application filed May 28, 1879.

*To all whom it may concern:*

Be it known that I, CYPRIEN MARIE TESSIÉ DU MOTAY, of Paris, France, resident of the city of New York, N. Y., have invented a new and Improved Process and Apparatus for Manufacturing Hydrogen Gas, (Case G,) of which the following is a full, true, and exact description, reference being had to the accompanying drawings.

This process is a modification of a process for which I have heretofore applied for a patent on the 17th day of May, 1879, and the apparatus shown is partly the same shown in that application, to which I refer for a fuller description of the apparatus shown and described in the specification of such application.

In that application steam carrying with it a certain amount of hydrocarbon was converted into hydrogen. In this process no naphtha is used; but the gas known as "water-gas," consisting of a combination of hydrogen and a certain amount of carbonic oxide, with certain other impurities, is used in connection with a certain amount of superheated steam. This mingled gas and vapor being brought in contact with heated lime, in a manner before described, the carbonic oxide becomes converted into carbonic acid, which acid is subsequently taken up by cooler portions of the lime, thereby converting said lime or quicklime into carbonate of lime. This carbonate of lime is reconverted into lime by the subsequent admission of a certain amount of gas containing hydrogen and air, whereby the carbonic acid is driven off. In order to carry out this process successfully it is important to remove from the water-gas, as far as possible, the sulphuric and other impurities which it contains when leaving the generator. Therefore I insert between the generator and the superheater (to be hereinafter described) a purifier, which may contain lime or other equivalent material. I do not limit myself to any particular form of purifier to be here used.

Figure 1:
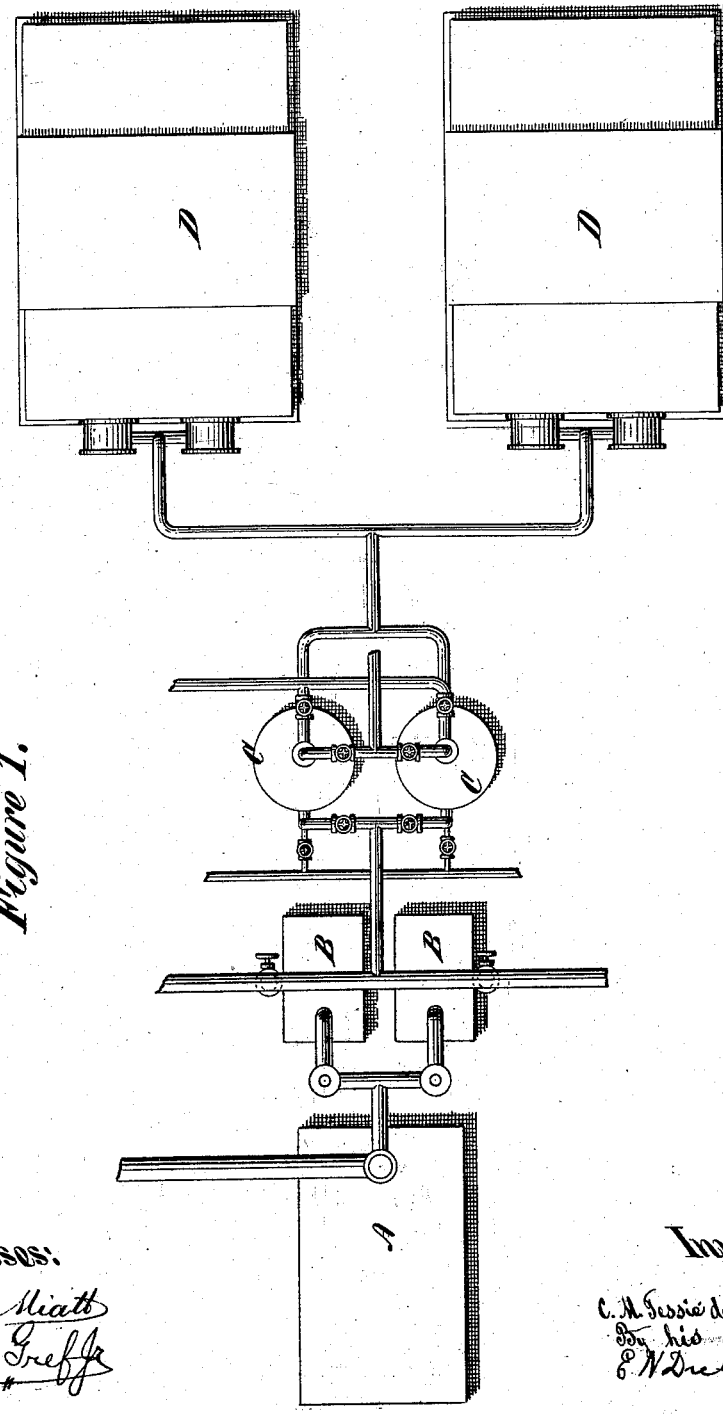
Figure 2:
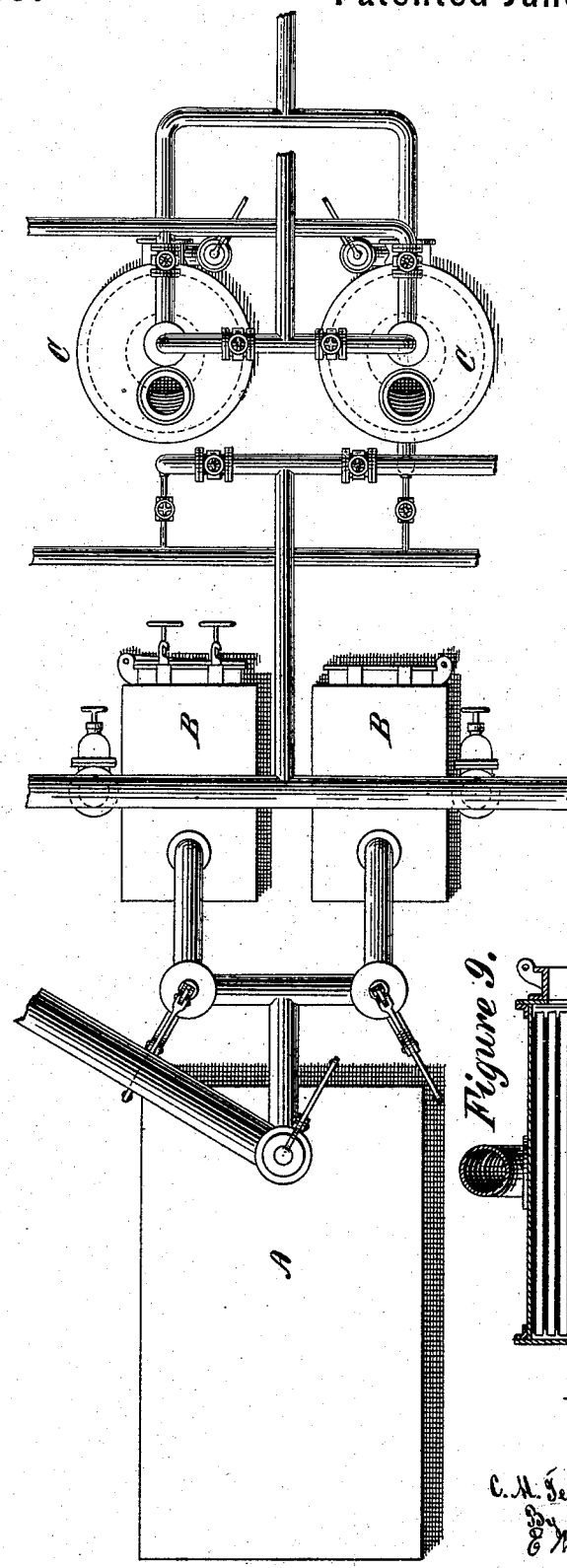
Figure 9:
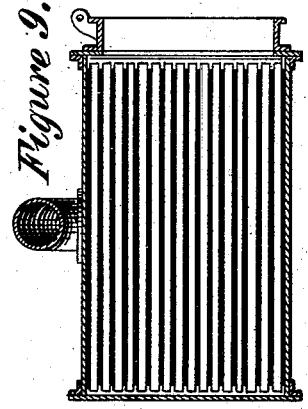

My process will be better understood from the accompanying drawings, in which Figure 1 represents a general plan view of the apparatus; Fig. 2, a view somewhat more in detail, showing parts of the same: Fig. 3, an elevation of the generator, purifier, and superheater. Figs. 4, 5, 6, 7, and 8 are views similar to those in the application heretofore referred to of the converting lime-furnace. Fig. 9 is a view of a grate which may be used in the purifier.

A represents a generator for producing water-gas, which, if the process is to be continuous, should be double, and may be constructed similar to those heretofore patented to E. J. Jerzmanowski. This class of generator produces alternately water-gas and carbonic oxide, and it may be useful to store the carbonic oxide in a separate holder for use in heating the superheater or the lime-furnace to be described, although a separate carbonic-oxide generator might be used for these purposes. The water-gas produced as described is next taken through one of two purifiers, B, where the sulphur and other impurities are removed from it. Thence it passes through one of two superheaters, C, which are constructed in the same way as in my previous application, above referred to; but instead of introducing into these superheaters a current of steam and naphtha, I introduce simply a current of steam, by preference previously superheated in the walls of the generator A. This steam is introduced by means of the pipe P into the top of one of these superheaters. All the connecting-pipes are provided with suitable valves for regulating the flow, which are not here shown in detail. From this superheater the mingled gases pass to the converting lime-furnaces. The gases so passing consist of carbonic oxide, hydrogen, and steam. The result of the reaction between this combination of gases and vapor with the hot lime is their conversion into hydrogen and carbonic acid, the hydrogen being thus produced in a free—that is, uncombined—state, although mixed, as stated, with carbonic acid, and its volume becoming increased by the hydrogen which is set free from the steam. Passing through the cooler portion of the lime, this carbonic acid is taken up, and hydrogen alone results, which may be taken to a holder.

In practice it may be necessary to insert in to the connection between the generator and the purifier, or the purifier and superheater, a governing-holder to receive the excess of gas and maintain an even flow.

The advantage of this process is that nothing except coal and water is required to carry it out, since the lime can be converted into carbonate of lime and reconverted into lime without any serious detriment. In the process heretofore described there has been considerable waste in this regard.

There is an essential difference between the use of heated lime to effect the decomposition of the water-gas and steam, as in the present invention, and the employment of heated brick or metal for a similar purpose. With lime the reaction and decomposition take place at a lower temperature, and the resulting products of carbonic acid and hydrogen are obtained with more certainty than would be the case with brick.

What I claim as my invention, and desire to secure by Letters Patent, is—

1. In the manufacture of hydrogen, the method of obtaining the same in a free—that is, uncombined—state, which consists in passing a mixture of water-gas and steam through a body of highly-heated lime, thereby decomposing the hydrogen compounds and liberating the hydrogen, substantially as described.

2. The process of producing hydrogen hereinbefore described, which consists in passing a current of water-gas and steam through a body of highly-heated lime and subsequently through a body of lime at a lower temperature, substantially as and for the purposes described.

3. The process of producing hydrogen by repeated use of the same lime, whereby the operation can be made continuous, which consists in passing a current of water-gas and steam through a body of highly-heated lime, thereby converting the mixture into hydrogen and carbonic acid, and subsequently through another body of lime at a lower temperature, whereby the carbonic acid is absorbed, leaving the hydrogen, and afterward reconverting the carbonate of lime into lime by burning in its presence a sufficient amount of gas containing hydrogen, and reusing said lime, substantially as described.

4. The apparatus for producing hydrogen gas, which consists in a water-gas generator, a purifier for purifying said water-gas, a superheater for heating the currents of water-gas and steam, and a converting lime-furnace, substantially as described.

C. M. TESSIÉ DU MOTAY.

Witnesses:
S. F. SULLIVAN,
WM. J. SAWYER.